US006873957B1

(12) United States Patent
Chen et al.

(10) Patent No.: US 6,873,957 B1
(45) Date of Patent: Mar. 29, 2005

(54) SYSTEM AND METHOD FOR REPLICATING WEB-SITES

(75) Inventors: Jerome Chen, Fremont, CA (US); Nancy Slater, Fremont, CA (US)

(73) Assignee: GetThere, Inc., Menlo Park, CA (US)

( * ) Notice: Subject to any disclaimer, the term of this patent is extended or adjusted under 35 U.S.C. 154(b) by 759 days.

(21) Appl. No.: 09/699,087

(22) Filed: Oct. 27, 2000

(51) Int. Cl.[7] .............................................. G06F 17/60
(52) U.S. Cl. ...................... 705/1; 709/225; 709/217; 709/219; 715/513; 715/908; 345/760
(58) Field of Search .................................. 709/217, 219, 709/225; 705/1; 715/513, 908; 345/760

(56) References Cited

U.S. PATENT DOCUMENTS

| | | | |
|---|---|---|---|
| 5,898,836 A | 4/1999 | Freivald et al. | ........ 395/200.48 |
| 6,026,433 A | 2/2000 | D'Arlach et al. | ........... 709/217 |
| 6,701,343 B1 * | 3/2004 | Kenyon | ...................... 709/204 |
| 2003/0145007 A1 * | 7/2003 | Kenner et al. | ................ 707/10 |

FOREIGN PATENT DOCUMENTS

WO WO 98/14896 * 4/1998 ........... G06F/17/30

OTHER PUBLICATIONS

Bucholtz, "Multiple Vision Duplicate 'mirrored' Web sites could help ease demand for network resources", Jan. 20,1997, Telephony.online.*
Bharat et al., "Mirror, Mirror on the Web: A Study of Host Pairs with Replicated Content.", 1999.*
International Search Report re: PCT/US01/42814 mailed Oct. Feb. 1, 2002.

* cited by examiner

Primary Examiner—James P. Trammell
Assistant Examiner—Jalatee Worjloh
(74) Attorney, Agent, or Firm—Alston & Bird LLP (57) ABSTRACT

A computer-implemented method is disclosed for replicating Websites in a digital network. The method comprises converting a website into a Super Site, wherein the Super Site may be replicated. One or more Sub Sites is generated from the Super Site. The behaviors of the Sub Sites are configured to match desired population segment characteristics.

30 Claims, 6 Drawing Sheets

SYSTEM AND METHOD FOR REPLICATING WEB-SITES

BACKGROUND OF THE INVENTION

1. Field of the Invention

This invention relates generally to the field of network transaction services. More particularly, the invention relates to an improved system and method for replicating web-sites on a network.

2. Description of the Related Art

Through computer networks such as the Internet, businesses and individuals are able to create Web Sites that serve as an audio/visual medium to deliver information to users browsing the Web Site. Websites may be built and customized to the individual needs of the creator.

Web sites can be intricate and require thousands of men hours to develop. Businesses and individuals incur great costs in this process and dedicate a great number of people towards the Website's development and maintenance.

Often large companies have subsidiaries, or offices that desire their own Web sites that maintain a similar appearance to the parent or master Web site. However, the subsidiaries may need to exhibit different behaviors. Independently creating each of these sites often means expensive development costs for the parent or master company. Furthermore, creating sites independently is complicated if a subsidiary site is in a foreign language or involves different user options.

The web pages may contain text, graphics, images, sound, video, etc. and are generally written in a standard page or hypertext document description language known as the Hypertext Markup Language (HTML). The HTML format allows a web page developer to specify the location and presentation of the graphic, textual, sound, etc. on the screen displayed to the user accessing the web page. In addition, the HTML format allows a web page to contain links, such as the hypertext links described above, to other web pages or servers on the Internet. Simply by selecting a link, a user can be transferred to the new web page, which may be located very different geographically or topologically from the original web page.

SUMMARY OF THE INVENTION

A computer-implemented method is disclosed for replicating Websites in a digital network. The method comprises converting a website into a Super Site, wherein the Super Site may be replicated. One or more Sub Sites is generated from the Super Site. The behaviors of the Sub Sites are configured to match desired population segment characteristics.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

A computer-implemented method is disclosed for replicating Websites in a digital network. The method comprises converting a website into a Super Site, wherein the Super Site may be replicated. One or more Sub Sites is generated from the Super Site. The behaviors of the Sub Sites are configured to match desired population segment characteristics.

Embodiments of the present invention include various steps, which will be described below. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

An Exemplary Network Architecture

Figure 1:
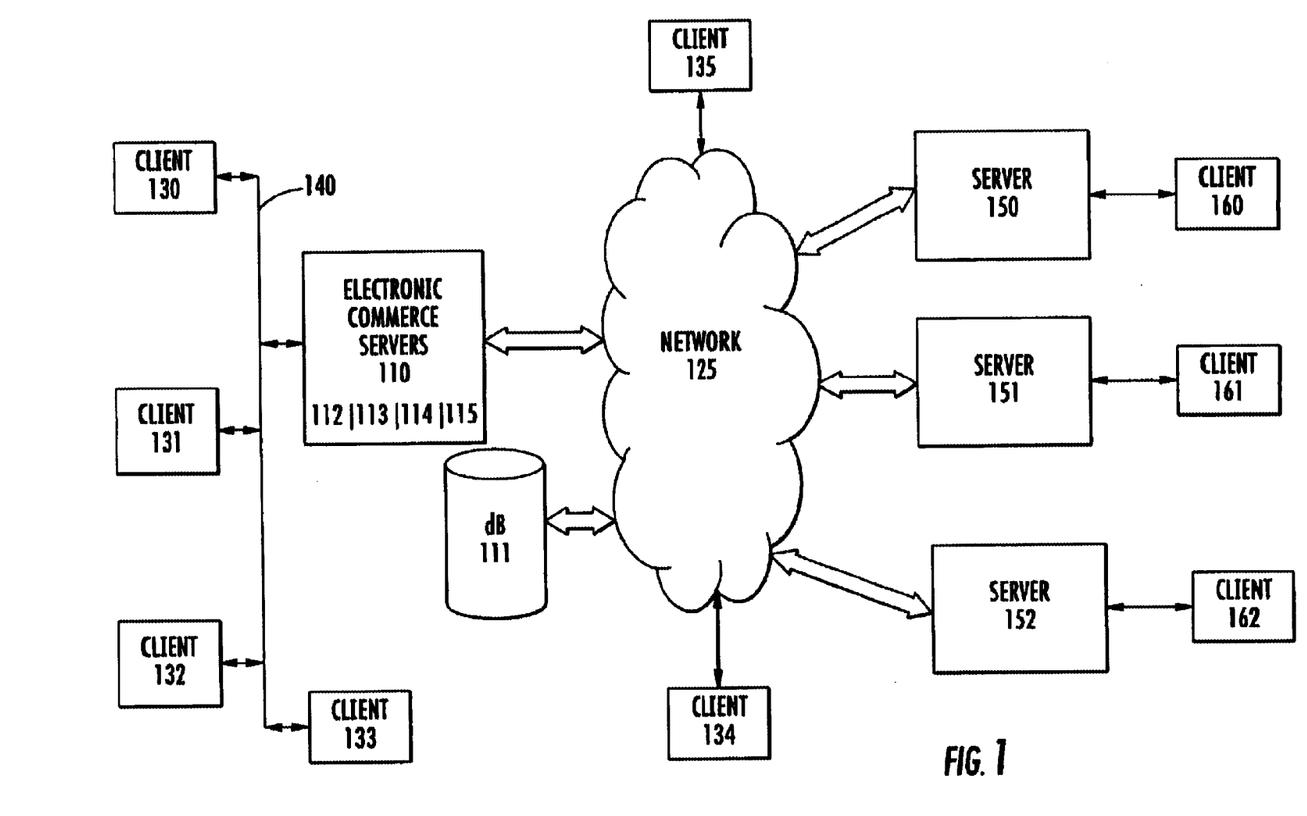
FIG. 1 illustrates an exemplary network architecture used to implement elements of the invention.

Elements of the present invention may be included within a client-server based system 100 such as that illustrated in FIG. 1. According to the embodiment depicted in FIG. 1, one or more electronic commerce servers 110 communicate to a plurality of clients 130–135. The clients 130–135 may transmit and receive data from electronic commerce servers 110 over a variety of communication media including (but not limited to) a local area network 140 and/or a larger network 125 (e.g., the Internet). Alternative communication channels such as wireless communication via satellite broadcast (not shown) are also contemplated within the scope of the present invention.

Electronic commerce servers 110 may include a database for storing various types of data. This may include, for example, specific client data (e.g., client account information and client preferences) and/or more general data. The database on electronic commerce servers 110 in one embodiment runs an instance of a Relational Database Management System (RDBMS), such as MicroSoft™ SQL-Server, Oracle™ or the like. This database may also be located externally, such as shown in FIG. 1, as database 111. Electronic Commerce Servers 110 may also host Websites, such as Super Site 112, and Sub Sites 113–115.

A user/client may interact with and receive feedback from electronic commerce servers 110 using various different communication devices and/or protocols. According to one embodiment, a user connects to electronic commerce servers 110 via client software. The client software may include a browser application such as Netscape Navigator™ or Microsoft Internet Explorer™ on the user's personal computer, which communicates to electronic commerce servers 110 via the Hypertext Transfer Protocol (hereinafter "HTTP"). In other embodiments included within the scope of the invention, clients may communicate with electronic commerce servers 110 via cellular phones and pagers (e.g., in which the necessary transaction software is electronic in a microchip), handheld computing devices, and/or touch-tone telephones.

Electronic commerce servers 110 may also communicate over a larger network (e.g., network 125) to other servers 150–152. This may include, for example, servers maintained by businesses to host their Web sites—e.g., content servers such as "snowboarding.com."

An Exemplary Computer Architecture

Figure 2:
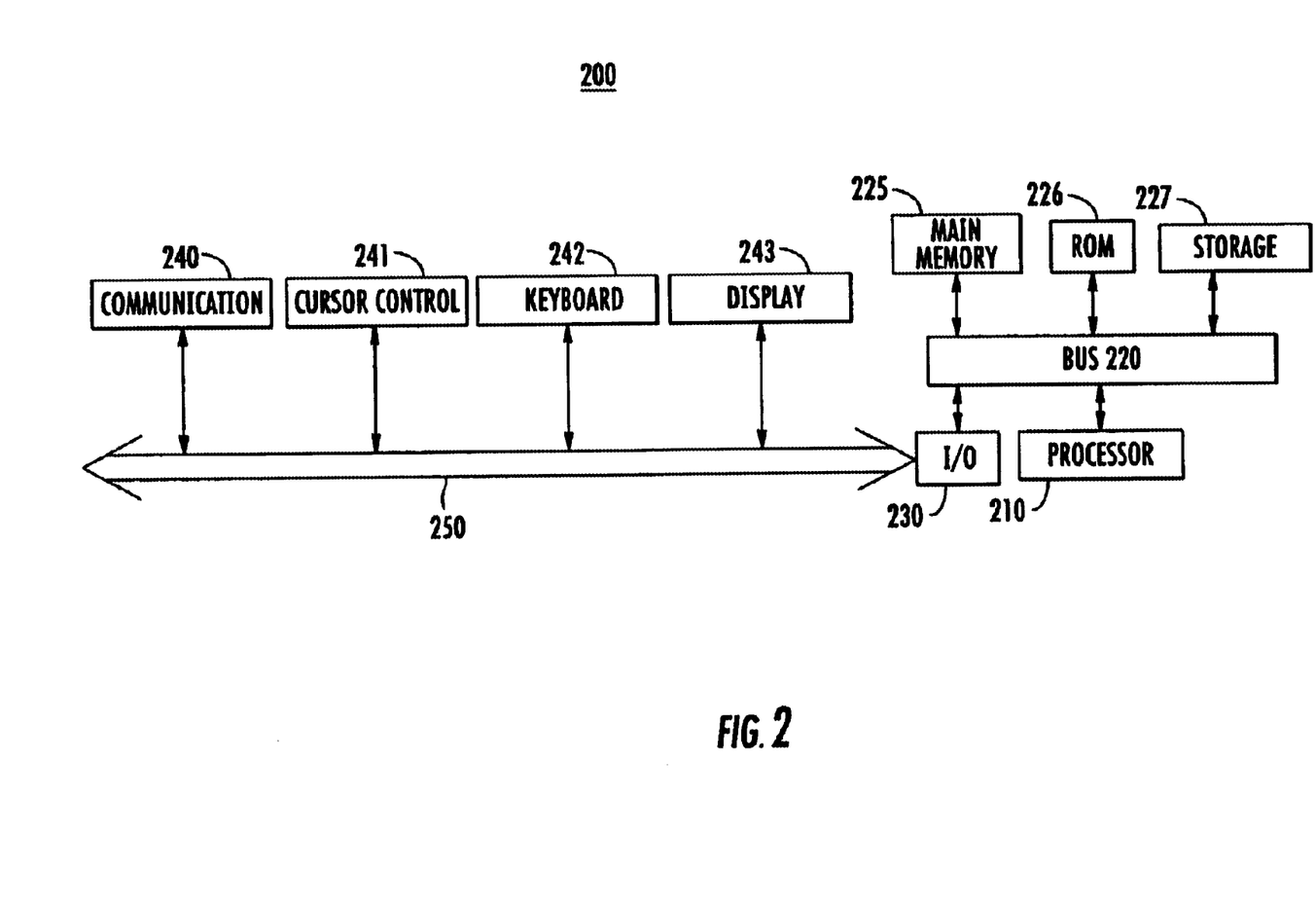
FIG. 2 illustrates an exemplary computer architecture used to implement elements of the invention.

Having briefly described an exemplary network architecture which employs various elements of the present invention, a computer system 200 representing exemplary clients 130–135 and/or servers (e.g., electronic commerce servers 110), in which elements of the present invention may be implemented will now be described with reference to FIG. 2.

One embodiment of computer system 200 comprises a system bus 220 for communicating information, and a processor 210 coupled to bus 220 for processing information. Computer system 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Computer system 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Computer system 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). For example, video news clips and related information may be presented to the user on the display device 243.

The communication device 240 is for accessing other computers (servers or clients) via a network 125, 140. The communication device 240 may comprise a modem, a network interface card, or other well-known interface device, such as those used for coupling to Ethernet, token ring, or other types of networks.

Embodiments of the a System and Method for Replicating Web-Sites

Figure 3:
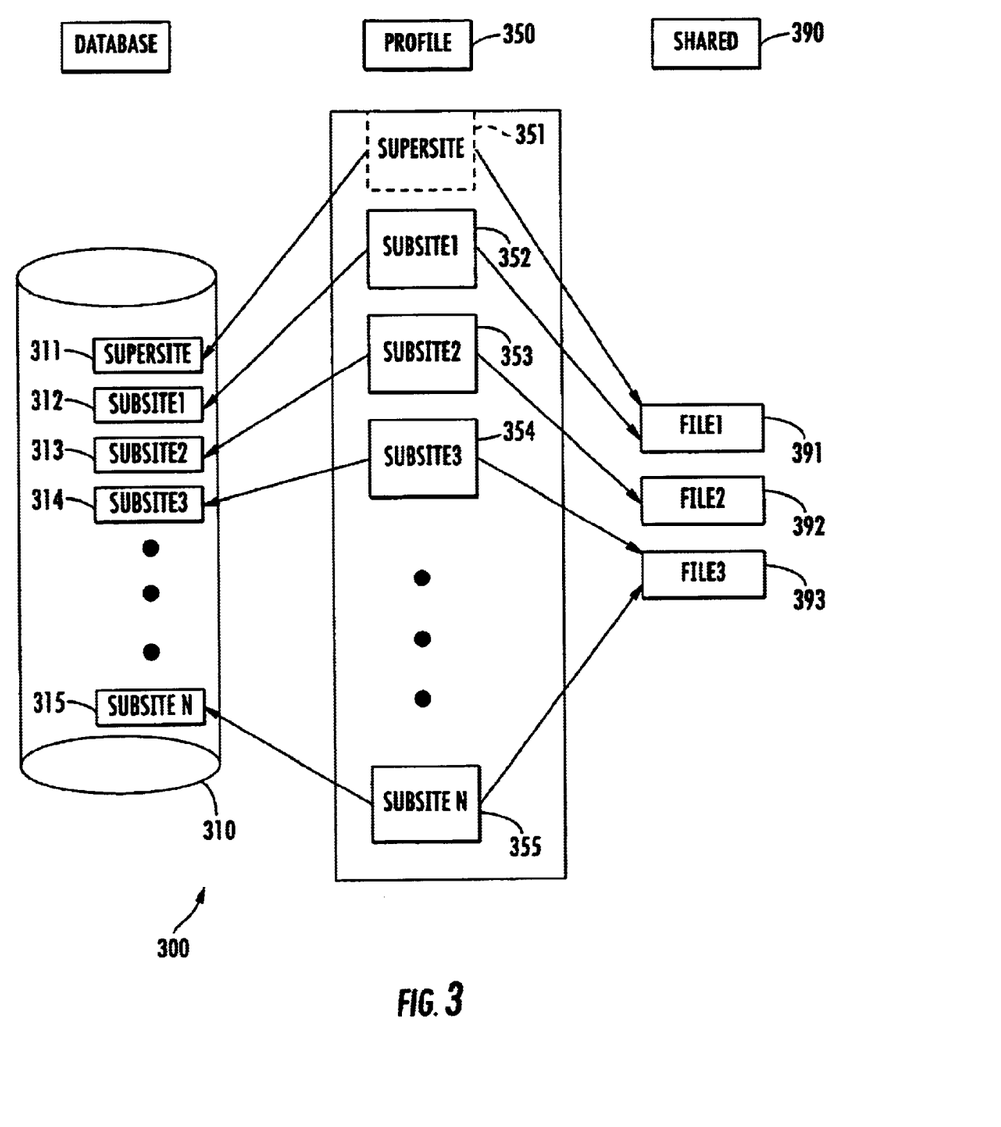
FIG. 3 shows a database, profile, and file structure for the present system.

FIG. 3 shows a database, profile, and file structure for the present system. There are three different types of data stored in system 300. Database 310 is a data store, that may be an Oracle™ database in one embodiment. The information is keyed by its site name, for example Super Site 311, or Sub Site 1 312 stored under each key may be additional information, such as travel policies for each site, market-based preferences, reference points, and instant ticketing commissions. Database 111 may be one such database.

Profile data 350 for Sub Sites may be organized under Super Site's profile area 351. As FIG. 3 shows, Sub Sites' profile areas 352–355 are both physically and logically organized under Super Site's profile area 351. In other embodiments, profile data 350 may be stored directly in a site's profile area, such as Super Site's profile area 351, or Sub Site's profile area 352. Profile data may be data such as configuration data, display configuration data, car vendor data, contract data, and data pointers that link to additional data.

Shared data 390 includes multiple shared files, for example File 1 391, and File 2 392. File 1 391 is a specific storage area that is referenced by handles pointing to the specific storage area. The handles are stored in profile data 350. The shared file area 390 may include data, such as, airline contracts, a database of preferred hotels, or a database of users.

The present method and system allows a Super Site to be created that is top level site. An existing web site on the World Wide Web may become a Super Site. Once a Web Site has been converted into a Super Site, it will have additional functionality to create subordinate sites. The subordinate site, is similar to the Super Site it was created from, but also includes customized layouts and designs. In addition to the ability to create a Sub Site from a Super Site, the present method and system allow a Sub Site to be created from a template site.

A template site may not be an active or live site, but instead, a web site whose sole function is to create Sub Sites. When a Sub Site is created, it is cloned from a specified template or Super Site. Configuration data is copied from the template site into the Sub Sites storage areas. The Sub Site may be customized, although changes to the Sub Site will not be reflected in the template or Super Site. However, the present method and system includes the ability to automatically update all Sub Sites when a Super Site or template are modified. The system 100 may also be administered to configurable to allow changes from one Sub Site to be reflected on another Sub Site.

Each Sub Site may exhibit different operational behaviors. For example, operational behaviors may include configurations that maintain legality with a particular country. For instance, international airlines sell their tickets all over the world. If the user is buying a ticket in the airline's native country, the site may be able to support same day sales, however, sales made far away may require a 72-hour advance purchase. The operational behaviors may be created for various segments of an end-user population within a single site. Another example of a customizable behavior includes providing the text of a web site in a foreign language. The present method and system maintains a single Universal Record Locator (URL) for all Sub Sites of a Super Site, but each Sub Site has its own distinct storage areas. To an end-user, the Super Site will appear to be a Sub Site.

There are three main usage scenarios: session based, user-based, and Sub Site crossover. In the session-based scenario, the user chooses which Sub Site is accessed. In the user-based scenario, the user is locked into the Sub Site on which the user is registered. In the third scenario, the Sub Site cross over, is a mix of the session-based and user-based scenarios.

Figure 4:
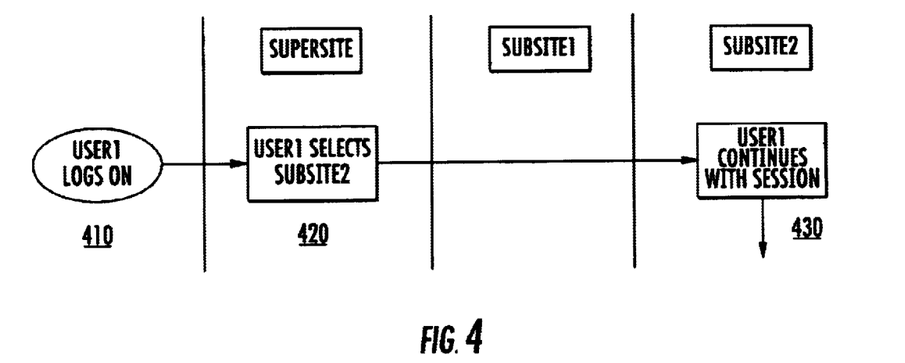
FIG. 4 is a flow diagram of a session-based usage scenario.

FIG. 4 is a flow diagram of a session-based usage scenario. At start block 410, the user logs onto the Super Site 112. In one embodiment, successfully logging on to Super Site 112 requires the user to enter a valid user identifier and password. Next, in processing block 420, the user selects which Sub Site 113–115 to access. FIG. 4, shows by example only, that the user selects Sub Site 2. System 100 directs the user to Sub Site 2 114 at processing block 430. There user continues with a Sub Site 2 114 session.

Figure 5:
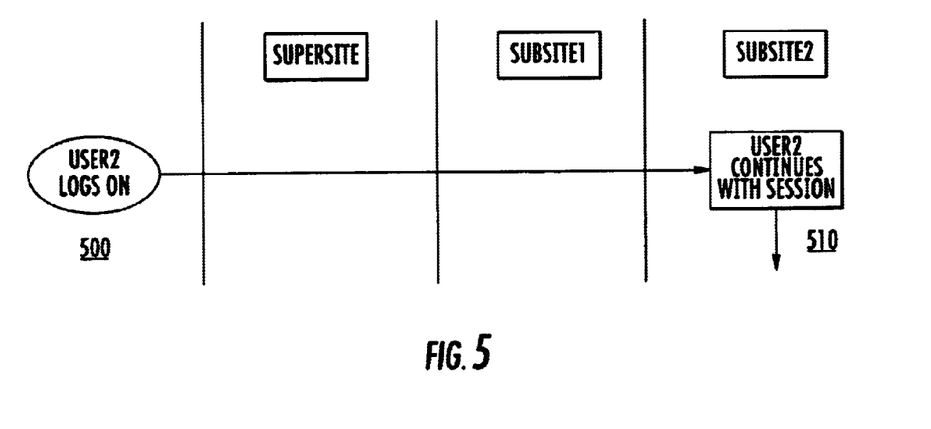
FIG. 5 is a flow diagram of a user-based usage scenario.

FIG. 5 is a flow diagram of a user-based usage scenario. At start block 500, the user logs onto the sub or Super Site, which the user is registered on. For example, the user will enter a user identifier and password. With a successful log on, system 100 can verify which Sub Site the user is a registered user on. By example, FIG. 5 shows at processing block 510, that he user is forced into Sub Site 2 114. Once there, the user continues with a Sub Site 2 114 session.

Figure 6:
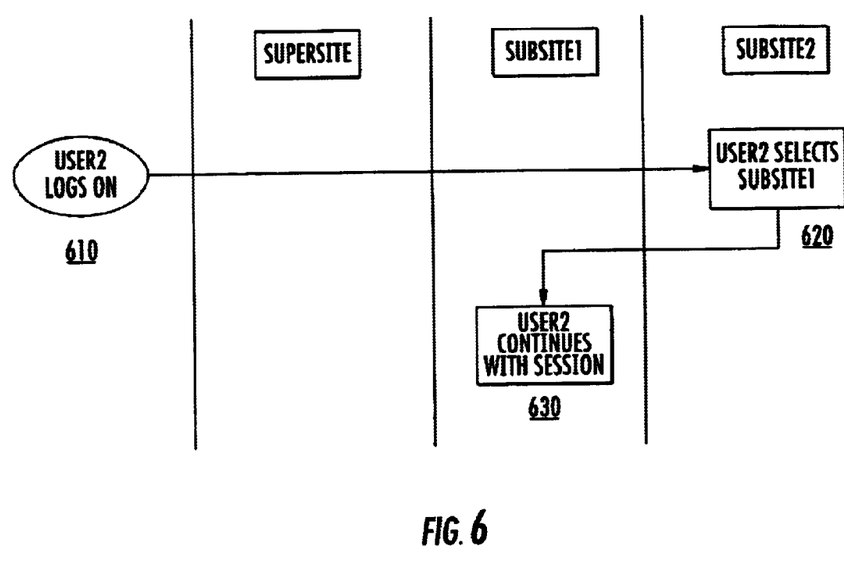
FIG. 6 is a flow diagram of a Sub Site crossover usage scenario.

FIG. 6 is a flow diagram of a Sub Site crossover usage scenario. At start block 610, the user logs onto the Sub Site or Super Site, which the user is registered on. For example, the user will enter a user identifier and password. With a successful log on, system 100 can verify which if any Sub Site the user is a registered user on. The user is then presented a list of accessible Sub Sites to which the user can cross over to, for the remainder of the session at processing block 620. By example, FIG. 6 shows at processing block 620, that the user selects Sub Site 1 and the user is directed to Sub Site 1 113 from Sub Site 2 114. At processing block 630, the user continues the Sub Site 1 113 session. In the Sub Site cross over scenarios, Sub Sites 113 and 114 were enabled to be session-based on Super Site 112. Administrators for the Sub Sites 113–115 specify the other Sub Sites 113–115 users are "allowed" to cross over from into their Sub Site.

Other behaviors that may be configured for an individual Sub Site may include: availability of a low fare ticket search; desired content of stored records; selection of certain user databases; desired security levels; availability of a quick search; and links to other data tables. These data tables may include: travel polices available for users of the Sub Site; market preference configurations; what air contracts and discounts are available; what preferred hotel properties are available, and what preferred car rental vendors are available.

A Super Site administrator may "trickle" changes down to any given set of Sub Sites. A Super Site is selected to be the "copy from" site and one or more Sub Sites are selected by the system administrator as targets. When the change is submitted, the values from the origination site are copied to the target sites. Functionalities that may be copied, include for example, are travel policies, Passenger name record editor fields, and air/car/hotel market-based preferences.

Administrators of a Super Site are also allowed additional functionalities. For example, a Super Site administrator may create a Sub Site and either immediately activate or delay the activation of the site. The Super Site administrator may also configure the electronic mail address to which messages are sent when a site is created, activated, or deactivated. For security reasons, a user wishing to create a Sub Site must enter a creation key. The Super Site administrator has links to all Sub Sites within the Super Site.

In addition, administrators are able to modify setting of Sub Sites. As described above, changes made to the Super Site may be automatically reflected in the Sub Site. System 100 copies the specified settings from the Super Site and over writes the settings of the Sub Site. During this procedure in the case of airline reservation systems, passenger name record (PNR) format strings and fields are overwritten. PNR exclude fields are over written, as well as travel policies, and market based preferences. Data table from database 111 are copied.

A Sub Site administrator also may perform different functionalities. The Sub Site administrator may activate or deactivate a Sub Site. Also controlled is the electronic mail address of the Super Site and Sub Site administrators.

Furthermore, a Sub Site administrator may control whether or not the Sub Site may be used as a template site as described above.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method for use in digital communications network, comprising:
   converting a website into a Super Site, wherein the Super Site may be replicated;
   generating a plurality of Sub Sites from th Super Site, wherein the Sub Sites are accessible from a common address; and
   configuring behaviors of the Sub Sites to match desired population segment characteristics.

2. The method of clam 1, wherein the Super Site is a template site used for replicating Sub Sites.

3. The method of claim 1, wherein segment characteristics include custom ticket delivery options, regulating queues, editing passenger name records, security settings for the Sub Site, travel policies, geographic policy administration, reason codes, system behavior for travel policy, authorization of individuals, air configurations, air contra, car availability, car contracts, hotel display configuration, preferred hotel properties, hotel reference points, and market preferences.

4. The method of claim 1, wherein generating Sub Sites further comprises copying data records from a database for the Super Site into the Sub Site.

5. The method of claim 1, further comprising reflecting automatically changes made to the Super Site in the Sub Sites.

6. The method of claim 1, further comprising reflecting automatically changes made to one Sub Site on one or more Sub Sites.

7. The method of claim 1, further comprising sending automatically an electronic mail notification to one or more administrators that a Super Site or Sub Site has been changed.

8. The method of claim 1, further comprising directing a user straight to a Sub Site on which the user is a registered user.

9. The method of claim 1, further composing allowing a user to transfer from a first Sub Site to a second Sub Site.

10. The method of claim 1, further comprising allowing a user to transfer from the Super Site to a Sub Site.

11. The method of clam 1, wherein the Sub Sites are accessed from a universal record locator that is common to the Sub Sites.

12. A system for use in a digital communications network, comprising:
    means for converting a website into a Super Site, wherein the Super Site may be replicated;
    means for generating a plurality of Sub Sites from the Super Site, wherein the Sub Sites are accessible from a common address; and
    means for configuring behaviors of the Sub Sites to match desired population segment characteristics.

13. The system of claim 12, wherein the Super Site is a template site used for replicating Sub Sites.

14. The system of claim 12, wherein segment characteristics include custom ticket delivery options, regarding queues, editing passenger name records, security settings for the Sub Site, travel policies, geographic policy administration, reason codes, system behavior for travel policy, authorization of individuals, air configurations, air contracts, car availability, car contacts, hotel display configuration, preferred hotel properties, hotel reference points, and market preferences.

15. The system of claim 12, wherein the means for generating Sub Sites further comprises means for copying data records from a database for the Super Site into the Sub Site.

16. The system of claim 12, further comprising means for reflecting automatically changes made to the Super Site in the Sub Sites.

17. The system of claim 12, further comprising means for reflecting automatically changes made to one Sub Site on one or more Sub Sites.

18. The system of claim 12, further comprising means for sending automatically an electronic mail notification to one or more administrators that a Super Site or Sub Site has been changed.

19. The system of claim 12, further comprising means for directing a user straight to a Sub Site on which the user is a registered user.

20. The system of claim 12, further comprising means for allowing a user to transfer from a first Sub Site to a second Sub Site.

21. The system of claim 12, further comprising means for allowing a user to transfer from the Super Site to a Sub Site.

22. The system of claim 12, wherein the Sub Sites are accessed from a universal record locator that is common to the Sub Sites.

23. A computer readable medium having stored thereon a plurality of instructions, said plurality of instructions when executed by a computer, cause said computer to perform:

converting a website into a Super Site, wherein the Super Site may be replicated;

generating a plurality of Sub Sites from the Super Site, wherein the Sub Sites are accessible from a common address; and configuring behaviors of the Sub Sites to match desired population segment characteristics.

24. The computer-readable medium of claim 23 having stored thereon additional instructions, said additional instructions for generating Sub Sites when executed by a computer, cause said computer to further perform copying data records from a database for the Super Site into the Sub Site.

25. The computer-readable medium of claim 23 having stored thereon-additional instructions, said additional instructions when executed by a computer, cause said computer to further perform reflecting automatically changes made to the Super Site in the Sub Sites.

26. The computer-readable medium of claim 23 having stored thereon additional instructions, said additional instructions when executed by a computer, cause said computer to further perform reflecting automatically changes made to one Sub Site on one or more Sub Sites.

27. The computer-readable medium of claim 23 having stored thereon additional instructions, said additional instructions when executed by a computer, cause said computer to further perform sending automatically an electronic mail notification to one or more administrators that a Super Site or Sub Site has been changed.

28. The computer-readable medium of claim 23 having stored thereon additional instructions, said additional instructions when executed by a computer comprises, cause said computer to further perform directing a user straight to a Sub Site on which the user is a registered user.

29. The computer-readable medium of claim 23 having stored thereon additional instructions, said additional instructions when executed by a computer, cause said computer to further perform allowing a user to transfer from a first Sub Site to a second Sub Site.

30. The computer-readable medium of claim 23 having stored thereon additional instructions, said additional instructions when executed by a computer, cause said computer to further perform allowing a user to transfer from the Super Site to a Sub Site.

* * * * *